Patented Nov. 14, 1933

1,934,824

UNITED STATES PATENT OFFICE 1,934,824

TRACING MATERIAL

Waldemar Schwalbe, Edgar Fuchs, and Otto Schnecko, Wiesbaden, Germany, assignors to Du Pont Cellophane Company Inc., New York, N. Y.

No Drawing. Application December 12, 1930, Serial No. 502,006, and in Germany December 16, 1929

17 Claims. (Cl. 91—68)

This invention relates to tracing material.

It has been proposed before now to use transparent sheets of cloth, nitrocellulose, and of acetyl cellulose for tracing. The use of all these substances has, however, been attended with the disadvantage that it is necessary to use an impenetrable India ink in order to obtain a clear photographic reproduction. With these prior art materials pencil and ordinary ink lines gave faint, uneven, or blurred photographic reproductions.

It is an object of this invention to produce a tracing material capable of giving sharp photographic reproductions of pencil drawings and which is in other ways equal or superior to existing tracing materials.

The objects of this invention are accomplished by the use of a cellulose hydrate film. This film may be coated on each side or on one side with a thin layer of lacquer or it may be uncoated. Both the coated and the uncoated sheets will, however, carry upon one surface a coating consisting principally of cellulose derivatives or resins or a mixture of these materials with a small quantity of a filler such as starch, talc, or chalk. The starch, talc or chalk are not essential but produce a preferred surface. It is upon this surface that the drawing is done, the granular nature of the coating being favorable to the retention of ink lines.

It does not matter how the surface for writing is produced on the film. It is advisable to apply a rough layer to the cellulose hydrate film, for instance, by spraying. The layer applied should consist principally of cellulose derivatives or resins or a mixture of these two materials; if desired, a small quantity of a filler such as starch, talc, prepared chalk or colloidal calcium carbonate may be added. For spraying, a solution may be used which, in addition to cellulose derivatives or resins, contains the filler suspended as finely divided as possible. It is also possible, of course, to apply a rough layer containing no filler first and subsequently to rub the filler into this layer. In every case, i. e., even if the filler was contained in the layer of coating applied, a subsequent treatment by rubbing with chalk talc, etc., is an advantage as it makes the material more uniform. Furthermore it is advantageous to use a cellulose hydrate film which already has a thin homogeneous coating of lacquer on both sides.

The following examples are illustrative but not limitative of the invention.

(1) 40 parts by weight of nitrocellulose and 10 parts by weight of tricresyl phosphate are dissolved in 1000 parts of a suitable solvent mixture in the usual way and to this solution 100 cc. of a suspension of about 30% starch, as well as 60 cc. of a 6% colloidal calcium carbonate solution, are added. This mixture is applied to the film in a suitable manner.

(2) To a solution of 40 parts by weight of nitrocellulose and 10 parts by weight of a softening agent in 950 parts of a known solvent 80 parts of a resin, for instance dewaxed dammar, are added and this mixture is applied to the film.

This new tracing material is much superior to prior art materials due to its higher permeability to photo-chemical rays. India ink drawings may be reproduced by the usual processes of exposure to light much more quickly than by means of the usual tracing material. Furthermore, the surprising phenomenon was observed that lines which do not reproduce well, such as lead pencil or chalk lines, and which only give blurred outlines with the usual tracing materials, give clear, sharp outlines when the new material is used. This constitutes an important innovation since, in industry, for the sake of simplicity about 80% of all drawings are made with a lead pencil. The new material is, furthermore, superior to nitrocellulose in being less flammable, and is superior to gelatine in having higher mechanical strength.

The new material is not damaged by drawing pens and erasures can be made well on it.

As many apparently widely different embodiments of this invention may be made without departing from the spirit and scope thereof, it is to be understood that we do not limit ourselves to the specific embodiments thereof except as defined in the appended claims.

We claim:

1. A tracing sheet comprising cellulose hydrate coated with a material resistant to the action of writing fluids and containing a finely divided filler capable of retaining writing fluid lines.

2. A tracing sheet comprising cellulose hydrate coated with a composition containing one of a group of substances consisting of a resin and a cellulose derivatives and also containing a finely divided filler.

3. A tracing sheet comprising cellulose hydrate coated with a layer of material containing a finely divided filler capable of retaining ink lines.

4. A tracing sheet comprising cellulose hydrate coated with a lacquer and a finely divided filler.

5. A tracing sheet consisting of cellulose hydrate coated on both sides with a lacquer and on one side with a composition comprising nitrocellulose, a softener, a solvent, a resin, and suspended starch and colloidal calcium carbonate.

6. A tracing sheet comprising cellulose hydrate coated with a composition comprising a resin and a finely divided filler.

7. A tracing sheet comprising cellulose hydrate coated with a composition comprising a cellulose derivative and a finely divided filler.

8. A tracing sheet comprising cellulose hydrate and a coating comprising one of a group of substances consisting of a resin and a cellulose derivative, admixed with a granular filler.

9. A tracing sheet comprising cellulose hydrate coated with a composition comprising one of a group of substances consisting of a resin and a cellulose derivative in admixture with one of a group of substances consisting of starch, talc, and chalk.

10. A tracing sheet comprising cellulose hydrate coated with a composition comprising a cellulose ester and a finely divided filler.

11. A tracing sheet comprising cellulose hydrate coated with a composition comprising cellulose nitrate and a finely divided filler.

12. A tracing sheet comprising cellulose hydrate and a coating comprising one of a group of substances consisting of a resin admixed with a granular filler.

13. A tracing sheet comprising cellulose hydrate and a coating comprising one of a group of substances consisting of a cellulose ester admixed with a granular filler.

14. A tracing sheet comprising cellulose hydrate coated with a composition comprising one of a group of substances consisting of resin and a cellulose ester in admixture with one of a group of substances consisting of starch, talc, and chalk.

15. A tracing sheet comprising cellulose hydrate coated with a composition comprising one of a group of substances consisting of dammar resin and cellulose nitrate in admixture with one of a group of substances consisting of starch, talc, and chalk.

16. A tracing sheet comprising a cellulose hydrate sheet coated on both sides with a thin coating of lacquer and coated on one side with a composition comprising a cellulose derivative and a finely divided filler.

17. A tracing sheet comprising regenerated cellulose coated on both sides with a lacquer and coated on one side with a lacquer and a finely divided filler.

WALDEMAR SCHWALBE.
EDGAR FUCHS.
OTTO SCHNECKO

CERTIFICATE OF CORRECTION.

Patent No. 1,934,824.

November 14, 1933.

WALDEMAR SCHWALBE, ET AL.

It is hereby certified that error appears in the printed specification of the above numbered patent requiring correction as follows: Page 1, line 102, claim 2, for "derivatives" read derivative; and that the said Letters Patent should be read with this correction therein that the same may conform to the record of the case in the Patent Office.

Signed and sealed this 16th day of January, A. D. 1934.

(Seal)

F. M. Hopkins
Acting Commissioner of Patents.

one side with a composition comprising nitrocellulose, a softener, a solvent, a resin, and suspended starch and colloidal calcium carbonate.

6. A tracing sheet comprising cellulose hydrate coated with a composition comprising a resin and a finely divided filler.

7. A tracing sheet comprising cellulose hydrate coated with a composition comprising a cellulose derivative and a finely divided filler.

8. A tracing sheet comprising cellulose hydrate and a coating comprising one of a group of substances consisting of a resin and a cellulose derivative, admixed with a granular filler.

9. A tracing sheet comprising cellulose hydrate coated with a composition comprising one of a group of substances consisting of a resin and a cellulose derivative in admixture with one of a group of substances consisting of starch, talc, and chalk.

10. A tracing sheet comprising cellulose hydrate coated with a composition comprising a cellulose ester and a finely divided filler.

11. A tracing sheet comprising cellulose hydrate coated with a composition comprising cellulose nitrate and a finely divided filler.

12. A tracing sheet comprising cellulose hydrate and a coating comprising one of a group of substances consisting of a resin admixed with a granular filler.

13. A tracing sheet comprising cellulose hydrate and a coating comprising one of a group of substances consisting of a cellulose ester admixed with a granular filler.

14. A tracing sheet comprising cellulose hydrate coated with a composition comprising one of a group of substances consisting of resin and a cellulose ester in admixture with one of a group of substances consisting of starch, talc, and chalk.

15. A tracing sheet comprising cellulose hydrate coated with a composition comprising one of a group of substances consisting of dammar resin and cellulose nitrate in admixture with one of a group of substances consisting of starch, talc, and chalk.

16. A tracing sheet comprising a cellulose hydrate sheet coated on both sides with a thin coating of lacquer and coated on one side with a composition comprising a cellulose derivative and a finely divided filler.

17. A tracing sheet comprising regenerated cellulose coated on both sides with a lacquer and coated on one side with a lacquer and a finely divided filler.

WALDEMAR SCHWALBE.
EDGAR FUCHS.
OTTO SCHNECKO

CERTIFICATE OF CORRECTION.

Patent No. 1,934,824.　　　　　　　　　　　　　　November 14, 1933.

WALDEMAR SCHWALBE, ET AL.

It is hereby certified that error appears in the printed specification of the above numbered patent requiring correction as follows: Page 1, line 102, claim 2, for "derivatives" read derivative; and that the said Letters Patent should be read with this correction therein that the same may conform to the record of the case in the Patent Office.

Signed and sealed this 16th day of January, A. D. 1934.

(Seal)　　　　　　　　　　　　　　F. M. Hopkins
　　　　　　　　　　　　　　Acting Commissioner of Patents.

CERTIFICATE OF CORRECTION.

Patent No. 1,934,824.                                                    November 14, 1933.

WALDEMAR SCHWALBE, ET AL.

It is hereby certified that error appears in the printed specification of the above numbered patent requiring correction as follows: Page 1, line 102, claim 2, for "derivatives" read derivative; and that the said Letters Patent should be read with this correction therein that the same may conform to the record of the case in the Patent Office.

Signed and sealed this 16th day of January, A. D. 1934.

(Seal)

F. M. Hopkins
Acting Commissioner of Patents.